Dec. 29, 1959 — L. W. KIMBALL — 2,918,938
VALVE CONSTRUCTION
Filed March 23, 1954 — 2 Sheets-Sheet 1

Dec. 29, 1959   L. W. KIMBALL   2,918,938
VALVE CONSTRUCTION
Filed March 23, 1954   2 Sheets-Sheet 2
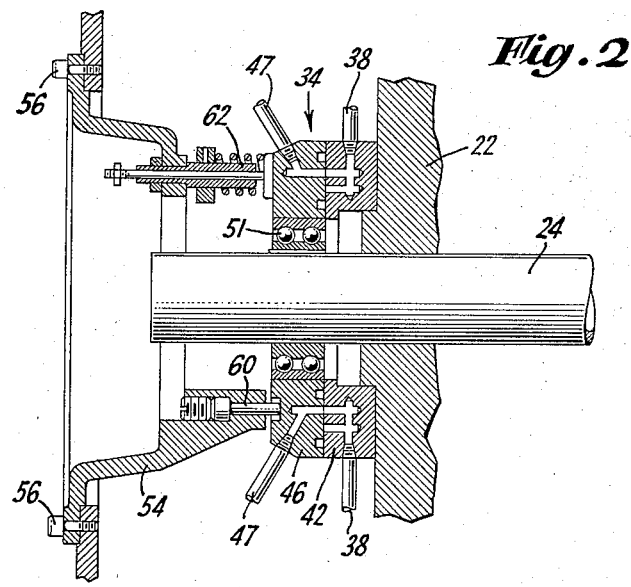
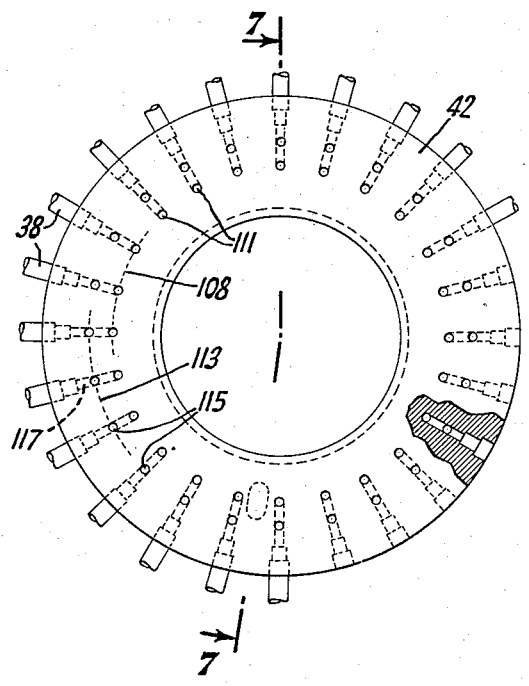
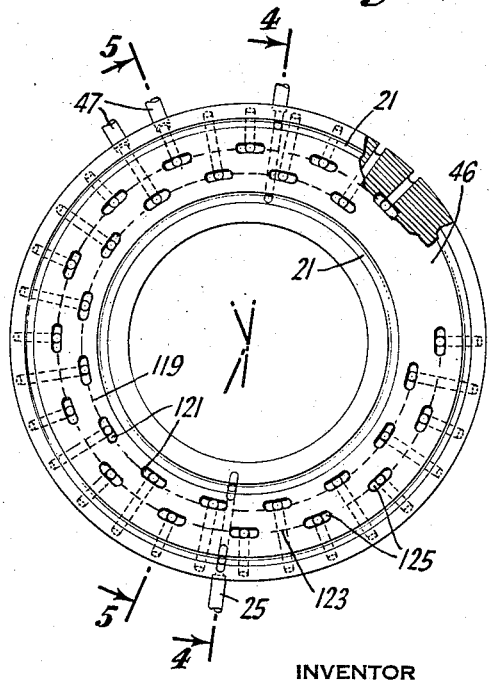
INVENTOR
LAWRENCE W. KIMBALL
BY
ATTORNEY

United States Patent Office 2,918,938
Patented Dec. 29, 1959

2,918,938

VALVE CONSTRUCTION

Lawrence W. Kimball, Bedford, Mass., assignor, by mesne assignments, to Sylvania Electric Products Inc., Wilmington, Del., a corporation of Delaware Application March 23, 1954, Serial No. 418,182

2 Claims. (Cl. 137—625.11)

This invention relates to valves and more particularly to valves which are especially suitable for regulating the flow of substances to and/or from a plurality of work-supporting members disposed on a continuous motion machine. Although the valve of this invention is described with particular reference to exhausting electric gaseous discharge devices, such as fluorescent lamps for example, its adaptability to regulate the flow of gases or liquids in a multitude of applications will be readily apparent to those skilled in the art.

In the art of manufacturing electric lamps, it has been the practice heretofore to evacuate the lamp envelope on an exhaust machine of the intermittent motion or indexing type in which the heads of the machine on which the lamps are disposed are advanced to a plurality of work stations at which communication from the heads to a vacuum pump is established through a valve. Generally speaking this valve usually comprises a pair of plates, one movable and the other fixed, the adjacent faces of which are in air-tight engagement with one another. Each plate of the valve is usually provided with a plurality of ports. The movement of the movable valve plate is synchronized with the indexing movement of the machine which carries the heads thereof to a plurality of work stations so that at each work station the ports in the movable plate are in register with the ports in the stationary plate and thus communication is established through the valve from the heads to the vacuum pump system. During indexing or the travel from one station to another, the ports in the movable plate advance out of register with the ports in the stationary plate and thus terminate communication through the valve from the heads to the vacuum pump system.

This type of valve has been found to be unsatisfactory when employed on a continuous motion exhaust machine because of its inherent inefficiency. Since the valve is usually open during the dwell periods only on the indexing machine, the elimination of dwell periods by the use of a continuous motion machine effects a substantial reduction in the total pumping time because the lamps are pumped intermittently. In order to increase the effective pumping time, it has been suggested that the stationary valve plate be provided with an elongated slot of considerable extension, thereby making possible continuous pumping during that portion of the operating cycle of the machine in which a port of the movable valve plate is in register with this slot. Although this construction would provide for continuous pumping during the time interval just defined, it would also introduce a very undesirable condition, viz., the connection of several lamps to one another through the valve. This condition is most unsatisfactory because it makes possible the flow of contaminants from one lamp into the several other lamps to which it is connected through the open valve.

In view of the foregoing, the primary object of this invention is to regulate the flow of substances to and/or from a plurality of work-supporting members disposed on a continuous motion machine.

Another object is to provide a valve for regulating the flow of substances to and/or from a plurality of work-supporting members disposed on a continuous motion machine in a manner such that continuous communication through the valve to each individual work-supporting member is established on the one hand while, on the other hand, communication through the valve from one work-supporting member to another work-supporting member is prevented.

These and other objects, advantages and features are attained in accordance with the principles of my invention by providing the stationary valve plate with a plurality of slots and the movable valve plate with a plurality of ports, the spacing of the slots from one another and the spacing of the ports from another on the one hand, and the relationship of the slots to the ports on the other hand, being such that continuous communication through each individual port is obtained and communication from one port to another port through the slots is prevented.

In the specific embodiment of my invention illustrated in the accompanying drawings, Figure 1 is a vertical sectional view of one end of a lamp exhaust machine with which the valve of this invention may be employed.

Figure 2 is an enlarged fragmentary sectional view of the valve assembly.

Figure 3 is a plan view of the inside face of the stationary valve plate.

Figure 6 is a plan view of the inside face of the movable valve plate.

Figure 1:
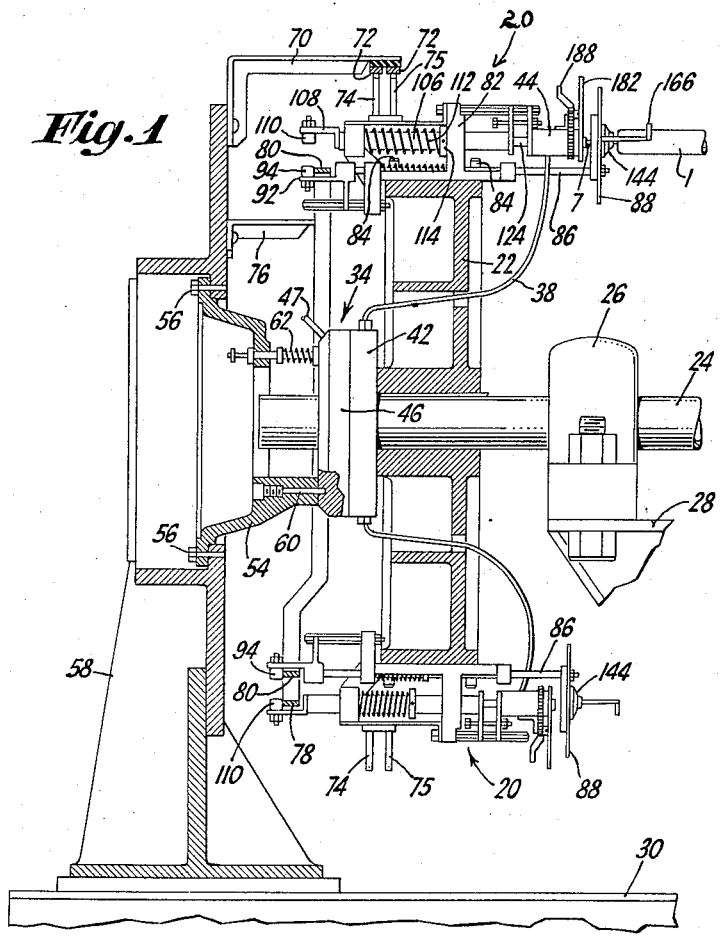

Referring now to the drawings, particularly Figure 1 thereof, the specific embodiment of the valve of this invention is illustrated associated with the "Apparatus for Exhausting Electric Discharge Devices" shown and described in the application of Dodge et al., Serial No. 343,842, filed March 23, 1953, now Patent No. 2,726,799, granted December 13, 1955. This apparatus for exhausting electric discharge devices comprises a plurality of head assemblies 20 mounted on a spider 22 keyed to a shaft 24 supported in a bearing bracket 26 mounted on a table 28 on a base 30. Shaft 24 is driven by a suitable drive mechanism not shown. Valve 34 disposed on shaft 24 is connected to each of the head assemblies 20 by a flexible tubing 38. A tubing 38 connects movable plate 42 of valve 34 to each head block 44, the stationary plate 46 being connected through a plurality of tubing 47 to one or more vacuum pumps and if desired to a source of flushing and/or filling gas (not shown).

A stationary valve plate support 54 (Figs. 1 and 2) is attached by bolts 56 to frame 58 mounted on base 30. The plate 46 of valve 34 is held stationary and prevented from rotating by means of pin 60 which extends through support 54 and into plate 46. Pressure is applied to effect and maintain a gas-tight seal between staitonary plate 46 and movable plate 42, which is fixedly mounted on the hub of spider 22, by means of a pair of spring-loaded pads 62 (one of which is shown) mounted in the support 54. The plate 46 is held concentric with plate 42 by a self-aligning bearing 51 which is mounted on the shaft 24.

The frame 58 has a plurality of inwardly extending arms 70 (one of which is shown) attached thereto which support a pair of commutator tracks 72. The tracks 72 are engaged during a portion of the operating cycle of the machine by flexible metal fingers 74 and 75 which are a part of the head assembly 20. The frame 53 also has a plurality of inwardly extending arms 76 (one of which is shown) on which cam tracks 78 and 80, for actuating certain mechanisms of the head assembly 20, are mounted.

Each head assembly 20 comprises a base 82 which is attached to the spider 22 by bolts 84 and which serves as a support for the several components of the head assembly. A rod 86, supported in bearings in the base 82, has a burner plate 88 mounted on one end thereof and an arm 92 mounted on the other end thereof. The arm 92 supports a cam follower 94 which rides on cam track 80. A sleeve 106, supported in bearings in the base 82, has an arm 108 mounted on one end thereof, the arm 108 supporting a cam follower 110 which rides on cam track 78. The sleeve 106 is loaded by spring 112 disposed thereon between a face of the base 82 and collar 114 mounted on the sleeve. Head block 44 is mounted on a rod 124 which is supported in bearings in the sleeve 106. Levers 182 and 188 are mounted on the head block 44. The burner plate 88, which is mounted on rod 86, has a burner 144 and a lamp-supporting cradle 166 mounted thereon. When a lamp 1 is disposed as shown in Figure 1, the tubulation 7 projecting therefrom extends through burner 144, burner plate 88 and into head block 44. The tubulation 7 is hermetically sealed within the head block 44 by actuation of levers 182 and 188.

Figure 4:
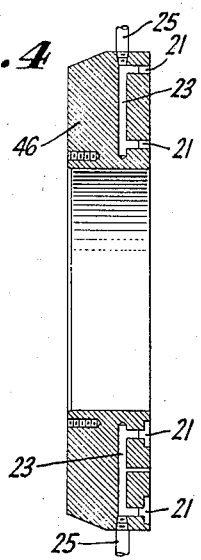
Figure 4 is a sectional view of the stationary valve plate of Figure 3, taken along the line 4—4 thereof.
Figure 5:
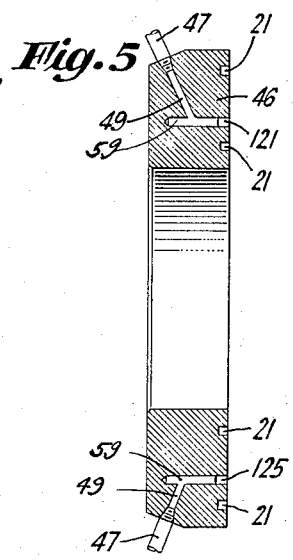
Figure 5 is a sectional view of the stationary valve plate of Figure 3, taken along the line 5—5 thereof.
Figure 7:
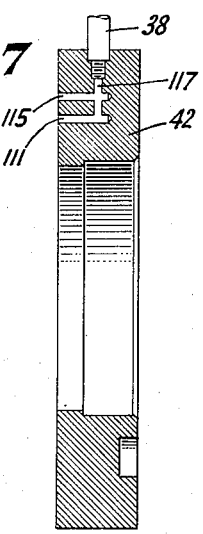
Figure 7 is a sectional view of the movable valve plate of Figure 6, taken along the line 7—7 thereof.

Referring now to Figures 6 and 7, the movable plate 42 of valve 34 has a ring 108 of ports 111 and a ring 113 of ports 115 therein, each pair of ports 111 and 115 on a common radial line being connected to one another within the plate by manifold 117, to which tubing 38 extending to each head block 44 is connected. Referring now to Figures 3, 4 and 5, stationary plate 46 of valve 34 has a ring 119 of elongated slots 121 and a ring 123 of elongated slots 125 therein, the slots 121 in ring 119 being located in staggered relationship with reference to the slots 125 in ring 123. Each of the slots 121 and 125 defines a station on the plate. Communication to the slots 121 and 125 is established through tubing 47 and drilled holes 49 and 59. The relative location of the slots 121 and 125 in the stationary plate 46 with respect to the ports 111 and 115 in the movable plate 42 is such that continuous communication may be established for each individual head 20 (Fig. 1) through its tubing 38 and manifold 117 in movable plate 42 to the tubing 47 extending from stationary plate 46, the path of this communication through the valve 34 being alternately through a port 111 in the movable plate 42 and a slot 121 in the stationary plate 46 on the one hand, and through a port 115 in the movable plate 42 and a slot 125 in the stationary plate 46 on the other hand. Thus, as a port 111 in the ring 108 of movable plate 42 starts to move out of communication with a slot 121 in the ring 119 of stationary plate 46, the port 115 in the ring 113, with which this particular port 111 is paired through the manifold 117, starts to move into communication with a slot 125 in ring 123 of stationary plate 46. A gas-tight seal between plates 42 and 46 is obtained by means of an oil film between the two plates, the oil being introduced therebetween through oil rings 21, drilled holes 23 and tubing 25.

The relative location of the slots 121 in the inner ring 119 of the stationary plate 46 with respect to one another and with respect to the ports 111 in the inner ring 109 of the movable plate 42 on the one hand; and the relative location of the slots 125 in the outer ring 123 of the stationary plate 46 with respect to one another and with respect to the ports 115 in the outer ring 113 of the movable plate 42 on the other hand, is such that two heads 20 are never in communication with one another through this valve. Thus manifolding of two or more heads is prevented and contaminants which may be in one lamp connected to a head 20 are isolated and prevented from being carried to another lamp in another head through the valve.

What I claim is:

1. A valve comprising: a movable circular valve plate and a stationary circular valve plate, the adjacent surfaces of which are in gas-sealing engagement with one another, said movable circular valve plate being provided with a plurality of pairs of ports formed in the engaging surface thereof, the ports of each pair of ports lying on a common radial line, and said stationary circular valve plate being provided with a plurality of slots formed in the engaging surface thereof, the relative location and size of the pairs of ports and the slots being such that as the pairs of ports in the movable valve plate traverse that portion of the stationary valve plate which is provided with slots, continuous communication alternately through one port then the other port of each pair of ports in the movable valve plate to the slots in the stationary valve plate is established, with a port of each pair of ports in the movable valve plate moving into communication with a slot in the stationary valve plate before the other port of said each pair of ports in the movable valve plate moves out of communication with a slot in the stationary valve plate.

2. A valve comprising: a movable circular valve plate and a stationary circular valve plate, the adjacent faces of which are in gas-sealing engagement with one another, said movable circular valve plate being provided with a plurality of spaced sets of ports formed in the engaging face thereof, the corresponding ports in each set being located equi-distant from the center thereof and the ports in each set being located on a common radial line and connected to each other by a manifold, and said stationary circular valve plate being provided with two spaced sets of slots formed in the engaging face thereof, the slots in one set being located in staggered relationship with reference to the slots in the other set and the relative location and size of the slots and the ports being such that, as the ports in the movable valve plate traverse that portion of the stationary valve plate which is provided with slots, continuous communication is established from each manifold in the movable valve plate, sequentially through the ports lying on a common radial line therewith, alternately to a slot in one set of slots in the stationary valve plate and to an adjacent slot in the other set of slots therein, each manifold moving out of communication with a slot before an adjacent manifold moves into communication therewith.

References Cited in the file of this patent

UNITED STATES PATENTS

| | | |
|---|---|---|
| 1,911,044 | Thrasher | May 23, 1933 |
| 1,976,417 | Steinberg | Oct. 9, 1934 |
| 2,349,822 | Gardner | May 30, 1944 |
| 2,504,925 | Gardner | Apr. 18, 1950 |
| 2,592,705 | Jewell | Apr. 15, 1952 |
| 2,677,391 | Chellberg | May 4, 1954 |